United States Patent
Lin et al.

(10) Patent No.: US 7,610,306 B2
(45) Date of Patent: Oct. 27, 2009

(54) MULTI-MODAL FUSION IN CONTENT-BASED RETRIEVAL

(75) Inventors: Ching-Yung Lin, Forest Hills, NY (US);
Apostol Natsev, White Plains, NY (US);
Milind R. Naphade, Fishkill, NY (US);
John R. Smith, New York, NY (US);
Belle L. Tseng, Forest Hills, NY (US)

(73) Assignee: International Business Machines Corporation, Armonk, NY (US)

( * ) Notice: Subject to any disclaimer, the term of this patent is extended or adjusted under 35 U.S.C. 154(b) by 357 days.

(21) Appl. No.: 10/611,235

(22) Filed: Jun. 30, 2003

(65) Prior Publication Data

US 2004/0267774 A1    Dec. 30, 2004

(51) Int. Cl.
*G06F 17/30* (2006.01)
(52) U.S. Cl. ............................ 707/104.1; 707/3; 707/4; 707/5; 707/6; 707/102
(58) Field of Classification Search ........................ None
See application file for complete search history.

(56) References Cited

U.S. PATENT DOCUMENTS

| | | | | |
|---|---|---|---|---|
| 5,577,241 | A * | 11/1996 | Spencer .......................... | 707/5 |
| 5,659,732 | A * | 8/1997 | Kirsch ............................ | 707/5 |
| 5,822,745 | A * | 10/1998 | Hekmatpour ................. | 706/59 |
| 5,864,845 | A * | 1/1999 | Voorhees et al. ............... | 707/5 |
| 5,873,080 | A * | 2/1999 | Coden et al. .................... | 707/3 |
| 5,893,110 | A * | 4/1999 | Weber et al. ............. | 707/104.1 |
| 5,913,215 | A * | 6/1999 | Rubinstein et al. ............ | 707/10 |
| 5,963,670 | A * | 10/1999 | Lipson et al. ............... | 382/224 |
| 6,009,422 | A * | 12/1999 | Ciccarelli ...................... | 707/4 |
| 6,175,829 | B1 * | 1/2001 | Li et al. .......................... | 707/3 |
| 6,243,713 | B1 * | 6/2001 | Nelson et al. ............. | 707/104.1 |
| 6,411,724 | B1 * | 6/2002 | Vaithilingam et al. ....... | 382/100 |
| 6,621,941 | B1 * | 9/2003 | Syeda-Mahmood et al. . | 382/306 |
| 6,697,818 | B2 * | 2/2004 | Li et al. ................... | 707/103 R |
| 6,718,063 | B1 * | 4/2004 | Lennon et al. ............... | 382/224 |
| 6,748,398 | B2 * | 6/2004 | Zhang et al. ............. | 707/104.1 |
| 6,804,684 | B2 * | 10/2004 | Stubler et al. ............ | 707/104.1 |
| 6,915,308 | B1 * | 7/2005 | Evans et al. ............... | 707/104.1 |

(Continued)

OTHER PUBLICATIONS

"Multimodal interfaces for multimedia information agents" Waibel, A.; Suhm, B.; Minh Tue Vo; Jie Yang Acoustics, Speech, and Signal Processing, 1997. ICASSP-97., 1997 IEEE International Conference on, vol. 1, Iss., Apr. 21-24, 1997 pp. 167-170 vol. 1 URL: http://ieeexplore.ieee.org/iel3/4635/13187/00599587.pdf?isnumber=13187II=STD&arnumber=599587&arnu.*

(Continued)

*Primary Examiner*—Neveen Abel Jalil
*Assistant Examiner*—Mark Andrew X Radtke
(74) *Attorney, Agent, or Firm*—Ference & Associates LLC (57) ABSTRACT

The present invention relates to the use of search fusion methods for querying multimedia databases and more specifically to a method and system for constructing a multimodal query of a multimedia repository by forming multiple uni-modal searches and explicitly selecting fusion methods for combining their results. The present invention also relates to the integration of search methods for content-based retrieval, model-based retrieval, text-based retrieval, and metadata search, and the use of graphical user interfaces allowing the user to form queries fusing these search methods.

6 Claims, 8 Drawing Sheets

U.S. PATENT DOCUMENTS

2004/0205482 A1* 10/2004 Basu et al. ............... 715/500.1

OTHER PUBLICATIONS

"Sammie—Software Applied to Multimodal Images & Education" Staemmler, M.; Claridge, E.; Cornelius, J. Image Management and Communication in Patient Care, 1993. IMAC 93. Proceedings. The Third International Conference on, Vol., Iss., Jun. 23-24, 1993 pp. 91-98 URL: http://ieeexplore.ieee.org/iel4/5406/14605/00665438.pdf?isnumber=14605II=STD&arnumbe.*

"CueVideo: a system for cross-modal search and browse of video databases" Syeda-Mahmood, T.; Srinivasan, S.; Amir, A.; Ponceleon, D.; Blanchard, B.; Petkovic, D. Computer Vision and Pattern Recognition, 2000. Proceedings. IEEE Conference on, vol. 2, Iss., 2000 pp. 786-787 vol. 2 URL: http://ieeexplore.ieee.org/iel5/6894/18560/00854958.pdf?isnumber=.*

"Content-based indexing of multimedia databases" Jian-Kang Wu Knowledge and Data Engineering, IEEE Transactions on, vol. 9, Iss. 6, Nov./Dec. 1997 pp. 978-989 URL: http://ieeexplore.ieee.org/iel4/69/14147/00649320.pdf?isnumber=14147II=STD&arnumber=649320&arnumber=649320&arSt=978&ared=989&arAuthor=Jian-Kang+Wu.*

"Multimodal Interface Techniques in Content-Based Multimedia Retrieval" by Ren et al. ICMI 2000, pp. 643-641, 2000. http://www.springerlink.com/content/euabkdn88akd9t6d/.*

"Mining Multimedia Documents by Visual Content" by Boujemaa et al. ERCIM News No. 47, Oct. 2001. http://www.ercim.org/publication/Ercim_News/enw47/boujemaa.html.*

"Working with Relations, Key Fields, and Indexes" and "Creating Your First Real Query" from Special Edition Using Access 97, Second Edition by Jennings, Que, Oct. 9, 1997.*

Dreilinger, D. and Howe, A. E. 1997. Experiences with selecting search engines using metasearch. ACM Trans. Inf. Syst. 15, 3 (Jul. 1997), 195-222. DOI=http://doi.acm.org/10.1145/256163.256164.*

"A statistical modeling approach to content based video retrieval" Naphade, M.R.; Basu, S.; Smith, J.R.; Ching-Yung Lin; Tseng, B. Pattern Recognition, 2002. Proceedings. 16th International Conference on, vol. 2, Iss., 2002 pp. 953-956 vol. 2 URL: http://ieeexplore.ieee.org/iel5/8091/22464/01048463.pdf?isnumber=22464II=STD&arnumber=1048463&arnumbe.*

"Interactive search fusion methods for video database retrieval" Smith, J.R.; Jaimes, A.; Lin, C.-Y.; Naphade, M.; Natsev, A.P.; Tseng, B. Image Processing, 2003. ICIP 2003. Proceedings. 2003 International Conference on, vol. 1, Iss., Sep. 14-17, 2003 pp. I-741-4 vol. 1 URL: http://ieeexplore.ieee.org/iel5/8824/27937/01247068.pdf?isnumber=27937II=.*

Flickner, M.; Sawhney, H.; Niblack, W.; Ashley, J.; Qian Huang; Dom, B.; Gorkani, M.; Hafner, J.; Lee, D.; Petkovic, D.; Steele, D.; Yanker, P., "Query by image and video content: the QBIC system," Computer, vol. 28, No. 9, pp. 23-32, Sep. 1995.*

* cited by examiner

MULTI-MODAL FUSION IN CONTENT-BASED RETRIEVAL

FIELD OF THE INVENTION

The present invention relates to the use of search fusion methods for querying multimedia databases and more specifically to a method and system for constructing a multi-modal query of a multimedia repository by forming multiple uni-modal searches and explicitly selecting fusion methods for combining their results. The present invention also relates to the integration of search methods for content-based retrieval, model-based retrieval, text-based retrieval, and metadata search, and the use of graphical user interfaces allowing the user to form queries fusing these search methods.

BACKGROUND OF THE INVENTION

The growing amounts and importance of digital video data are driving the need for more complex techniques and systems for video and multimedia indexing. Some recent techniques include extracting rich audio-visual feature descriptors, classifying multimedia content and detecting concepts using statistical models, extracting and indexing speech information, and so forth. While progress continues to be made on these directions to develop more effective and efficient techniques, the challenge remains to integrate this information together to effectively answer user queries of multimedia repositories.

There are a number of approaches for multimedia database access, which include search methods based on the above extracted information, as well as techniques for browsing, clustering, visualization, and so forth. Each approach provides an important capability. For example, content-based retrieval (CBR) allows searching and matching based on perceptual similarity of video content. On the other hand, model-based retrieval (MBR) allows searching based automatically extracted labels and detection results. For example, M. Naphade, et al., "Modeling semantic concepts to support query by keywords in video," *IEEE Proc. Int. Conf. Image Processing (ICIP)*, September 2002, teaches a system for modeling semantic concepts in video to allow searching based on automatically generated labels. New hybrid approaches, such as model vectors allow similarity searching based on semantic models. For example, J. R. Smith, et al., in "Multimedia semantic indexing using model vectors," in *IEEE Intl. Conf. on Multimedia and Expo (ICME)*, 2003, teaches a method for indexing multimedia documents using model vectors that describe the detection of concepts across a semantic lexicon. Text-based retrieval (TBR) applies to textual forms of information related to the video, which includes transcripts, embedded text, speech, metadata, and so on. Furthermore, video retrieval using speech techniques can leverage important information that often cannot be extracted or detected in the visual aspects of the video.

A typical video database system provides a number of facilities for searching based on feature descriptors, models, concept detectors, clusters, speech transcript, associated text, and so on. These techniques are broadly classified into three basic search functions: content-based retrieval (CBR), model-based retrieval (MBR), and text-based retrieval (TBR), which will now be discussed.

Content-based retrieval (CBR): Content-based retrieval (CBR) is an important technique for indexing video content. While CBR is not a robust surrogate for indexing based on semantics of image content (scenes, objects, events, and so forth), CBR has an important role in searching. For one, CBR compliments traditional querying by allowing "looks like" searches, which can be useful for pruning or re-ordering result sets based on visual appearance. Since CBR requires example images or video clips, CBR be only typically be used to initiate the query when the user provides the example(s), or within an interactive query in which the user selects from the retrieved results to search the database again, CBR produces a ranked, scored results list in which the similarity is based on distance in feature space.

Model-based retrieval (MBR): Model-based retrieval (MBR) allows the user to retrieve matches based on the concept labels produced by statistical models, concept detectors, or other types of classifiers. Since both supervised and unsupervised techniques are used, MBR applies for labels assigned from a lexicon with some confidence as well as clusters in which the labels do not necessarily have a specific meaning. In MBR, the user enters the query by typing label text, or the user selects from an inverted list of label terms. Since a confidence score is associated with each automatically assigned label, MBR ranks the matches using a distance D derived from confidence C using $D=1-C$. MBR applies equally well in manual and interactive searches, since it can be used to initiate query, or can be applied at intermediate stage to fuse with prior search results.

Text-based retrieval (TBR): Text-based retrieval (TBR) applies to various forms of textual data associated with video, which includes speech recognition results, transcript, closed captions, extracted embedded text, and metadata. In some cases, TBR is scored and results are ranked. For example, similarity of words is often used to allow fuzzy matching. In other cases, crisp matching of search text with indexed text, the matches are retrieved but not scored and ranked. As in the case for MBR, TBR applies equally well in manual and interactive searches.

Given these varied multimedia database search approaches, there is a great need to develop a solution for integrating these methods of data sources given their complimentary nature to bring the maximum resources to bear on satisfying a user's information need from a video database.

SUMMARY OF THE INVENTION

In accordance with at least one presently preferred embodiment of the present invention, there are broadly contemplated systems and methods for querying multimedia databases by fusing uni-modal searches using combination methods in conjunction with score normalization and aggregation functions.

In one embodiment, there is provided an integration of search methods for content-based retrieval, model-based retrieval, text-based retrieval, and metadata search, and the use of graphical user interfaces allowing the user to form queries that fuse these search methods.

In another embodiment, there is provided the use of search fusion methods in applications of information discovery and data mining, personalizing and summarizing content, content classification, and querying of an information repository.

In summary, one aspect of the invention provides an apparatus for constructing a multi-modal query, the apparatus comprising:

an arrangement for forming a plurality of uni-modal searches;

an input interface for permitting the selection of at least one fusion method to be used in combining the results of said uni-modal searches; and an arrangement for combining results of said uni-modal searches.

A further aspect of the invention provides a method of constructing a multi-modal query, the method comprising the steps of:

forming a plurality of uni-modal searches;

selecting at least one fusion method to be used in combining the results of said uni-modal searches; and combining results of said uni-modal searches.

Furthermore, an additional aspect of the invention provides a program storage device readable by machine, tangibly embodying a program of instructions executable by the machine to perform method steps for constructing a multi-modal query, the method comprising the steps of:

forming a plurality of uni-modal searches;

selecting at least one fusion method to be used in combining the results of said uni-modal searches; and combining results of said uni-modal searches.

For a better understanding of the present invention, together with other and further features and advantages thereof, reference is made to the following description, taken in conjunction with the accompanying drawings, and the scope of the invention will be pointed out in the appended claims.

DESCRIPTION OF THE PREFERRED EMBODIMENTS

Figure 1:
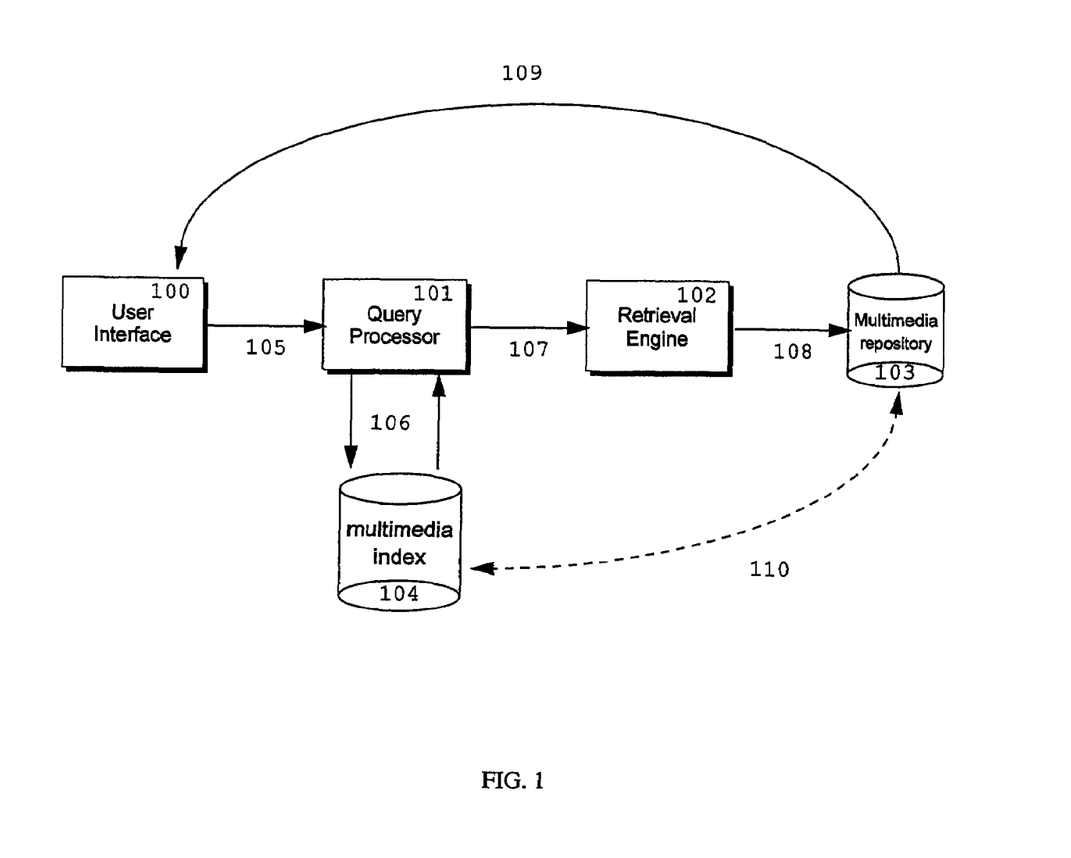
FIG. 1 shows a multimedia information retrieval system in which the query processor uses search fusion method.

FIG. 1 depicts one embodiment of a multimedia information retrieval system. As depicted, a user through a user interface (100) issues a query in step (105) to a multimedia information retrieval system. The query is handled by a query processor (101). The query processor searches in step (106) the set of stored index values (104) to find matches to the user's query. In the case of search fusion, the query processor may carry out a plurality of searches of stored index values and possibly use different search methods, such as content-based retrieval, model-based retrieval, text-based retrieval, etc. Furthermore, the query processing may additionally involve scoring of the results of these searches and combining the results using combination method, such as union, intersection, cross-product or join. The query processing may additional involve normalizing the scores of the results of individual searches and aggregating the scores using an aggregation function, such as minimum, average, product, etc. Once the multiple individual results are combined and rescored, a final set of matches are passed to a retrieval engine in step (107) and matching multimedia documents are retrieved in step (108) from the multimedia repository (103). The corresponding multimedia documents are determined on the basis of the association (110) of the ids or keys in the results lists with specific multimedia documents in the repository. The multimedia documents are then in step (109) returned to the user and displayed in the user interface (100).

Figure 2:
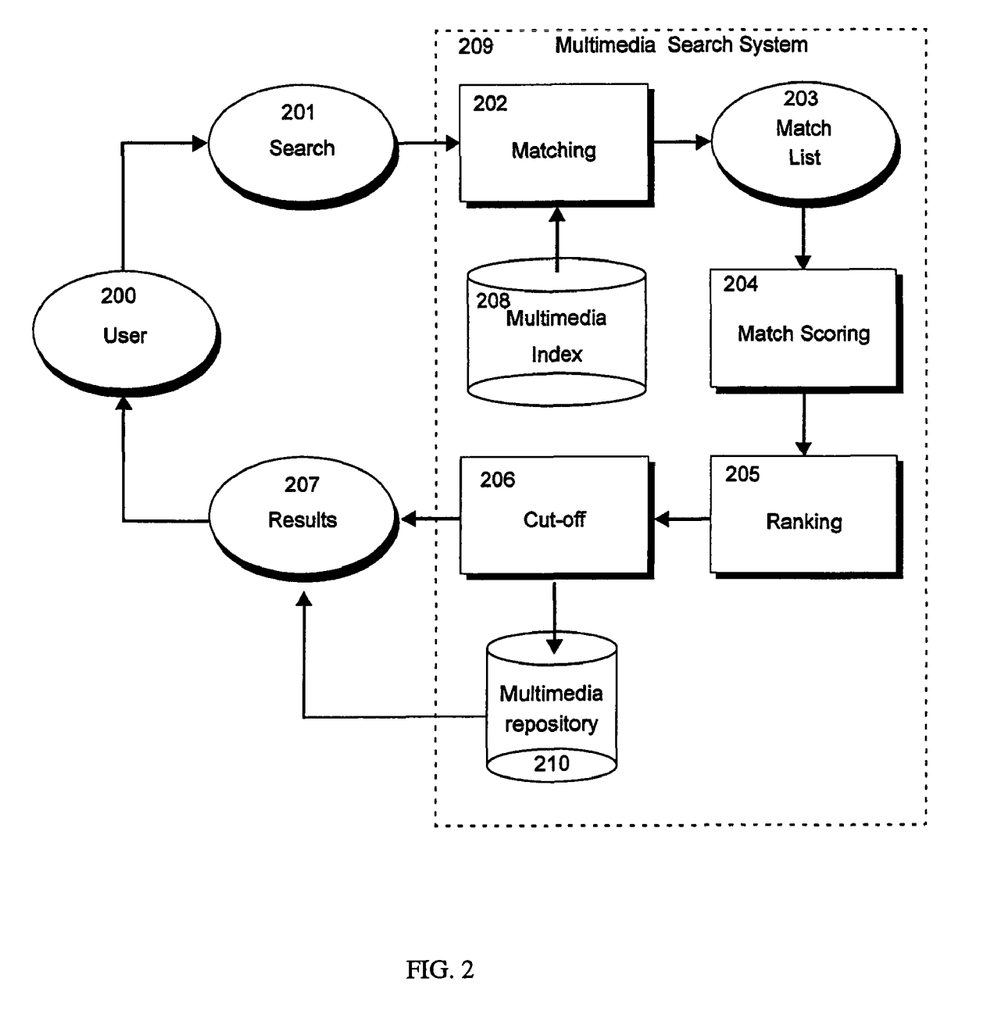
FIG. 2 shows the process of executing a uni-modal search on a multimedia repository.

FIG. 2 shows a process for executing a uni-modal search on a repository. The user (200) issues a search (201) to the multimedia search system (209). The search may be in the form of content-based, model-based, text-based search or other type of query. The search interface may optionally allow the user to author a search command or select from a menu. Alternatively, the search interface may optionally display multimedia documents to the user and allow the user to select which multimedia documents are relevant for the search. The system would then use index values associated with the document for forming the search. Alternatively, the search may be in the form of examples of multimedia documents provided by the user, in which case the multimedia documents can be analyzed and processed to create the searches.

Once the search is issued, it is matched in step (202) to the stored values in the index (206). The matching may involve similarity searching, nearest neighbor searching, or range querying. The matching process (202) produces a match list (203), which is then optionally scored in step (204). The match scoring may be determined on the basis of metric space computations. For example, considering a single search vector for content-based retrieval, the match scoring may be based on proximity measured in the multidimensional model vector space using a distance function, such as Euclidean distance or Manhattan distance. The scored match list is then optionally ranked in step (205), for example, to move the best matches to the top of the list. The ranked list is then optionally truncated in step (206), for example, to keep only the best matches. The results (207) are then provided back to the user.

Figure 3:
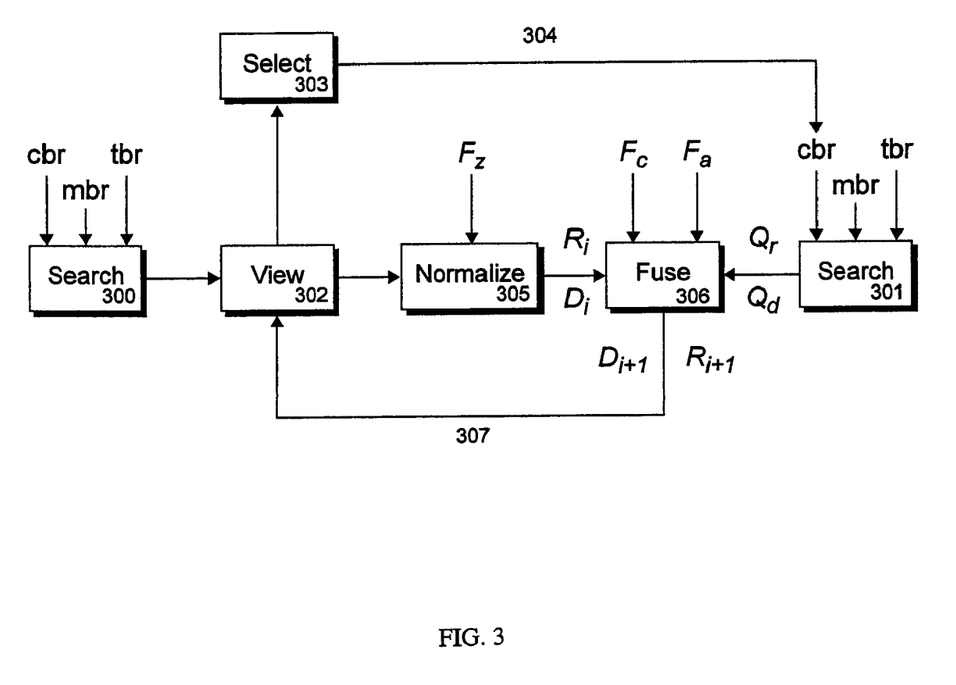
FIG. 3 shows the process of forming multiple searches in manual or interactive fashion.

FIG. 3 shows the process of forming a search fusion query by specifying multiple searches in manual or interactive fashion. The user's query starts with an initial search in step (300), which may involve content-based retrieval (CBR), model-based retrieval (MBR), text-based retrieval (TBR), or other kind of search, such as metadata search, database query, XML search. The search itself can be executed in the fashion shown in FIG. 2. This produces results, which are then optionally viewed in step (302). The user or system may then optionally select one of the items from the results list in step (303) and issue a new search in step (304), for example, a content-based retrieval (CBR) to the system. Alternatively, the user or system may issue a new search in step (301). The search then produces results which can be fused with previous one in step (306), where the results of the previous search are optionally normalized in step (305) prior to entering the fusion step (306). The fusion step (306) may optionally involve different combination methods, such as union, intersection, etc., and aggregation functions, such as min, max, average, etc., that rescoring the fused output results based on the scores of the input search results. The output of this fusion from step (306) can then be optionally viewed in step (302) and again be used as input for further selection, normalization, or fusion with other searches.

Overall, the search fusion method shown in FIG. 3 provides a way for normalizing, combining and re-scoring results lists using aggregation functions through successive operations. Normalization in step (305) is important for fusion since individual searches may use different scoring mechanisms for retrieving and ranking matches from (205). On the other hand, the combination methods determine how multiple results lists are combined from the set point of view. The aggregation functions determine how the scores from multiple results lists are aggregated to re-score the combined results.

The normalization methods that can be applied in step (305) provide a user with controls to manipulate the scores of a results list. Given a score $D_k(n)$ for each item with id n in results set k, the normalization methods produce the score $D_{i+1}(n)=F_z(D_i(n))$ for each item n as follows:

Invert: Re-ranks the results list from bottom to top. Provides "not" semantics. This can be useful for searches such as "retrieve matches that are not cityscapes." $D_{i+1}(n)=1-D_i(n)$.

Studentize: Normalizes the scores around the mean and standard deviation. This can be useful before combining results lists.

$$D_{i+1}(n) = \frac{D_i(n) - \mu_i}{\sigma_i},$$

where $\mu_i$ gives the mean and $\sigma_i$ the standard deviation, respectively, over the scores $D_i(n)$ for results list i.

Range normalize: Normalizes the scores within the range 0 ... 1.

$$D_{i+1}(n) = \frac{D_i(n) - \min(D_i(n))}{\max(D_i(n)) - \min(D_i(n))}.$$

The combination methods that can be applied in step (306) determine which members are kept from the input results lists. Consider results list $R_k$ for query k and results list $Q_r$ for current user-issued search, then the combination function $R_{i+1}=F_c(R_i, Q_r)$ combines the results lists by performing set operations on list membership. Some examples include the following combination methods:

Intersection: retains only those items present in both results lists. $R_{i+1}=R_i \cap Q_r$.

Union: retains items present in either results list. $R_{i+1}=R_i \cup Q_r$.

The aggregation functions that can be applied in step (306) determine how the combined results are scored. Consider scored results list $R_k$ for query k, where $D_k(n)$ gives the score of item with id=n and $Q_d(n)$ the scored result for each item n in the current user-issued search, then the aggregation function re-scores the items using the function $D_{i+1}(n)=F_a(D_i(n), Q_d(n))$. Some examples include the following aggregation functions:

Average: takes the average of scores of prior results list and current user-search. Provides "and" semantics. This can be useful for searches such as "retrieve items that are indoors and contain faces."

$$D_{i+1}(n) = \frac{1}{2}(D_i(n) + Q_d(n)).$$

Minimum: retains lowest score from prior results list and current user-issued search. Provides "or" semantics. This can be useful in searches such as "retrieve items that are outdoors or have music." $D_{i+1}(n)=\min(D_i(n), Q_d(n))$.

Maximum: retains highest score from prior results list and current user-issued search. $D_{i+1}(n)=\max(D_i(n), Q_d(n))$.

Sum: takes the sum of scores of prior results list and current user-search. Provides "and" semantics. $D_{i+1}(n)=D_i(n)+Q_d(n)$.

Product: takes the product of scores of prior results list and current user-search. Provides "and" semantics and better favors those matches that have low scores compared to "average". $D_{i+1}(n)=D_i(n) \times Q_d(n)$.

A: retains scores from prior results list. This can be useful in conjunction with "intersection" to prune a results list, as in searches such as "retrieve matches of beach scenes but retain only those showing faces." $D_{i+1}(n)=D_i(n)$.

B: retains scores from current user-issued search. This can be useful in searches similar to those above but exchanges the Arguments. $D_{i+1}(n)=Q_d(n)$.

The search fusion can be applied in manual or interactive fashion by considering whether a viewing step (302) is provided. In manual querying, the user may state the query or sequence of search fusion steps at the outset and not alter the searches, normalization or fusion operations once the query has started. For example, consider user looking for items showing a beach scene. For manual operation the user can issue a query with the following sequence of searches, which corresponds to the following query statement ((((beach color) AND (sky model)) AND water model) OR (beach text)). The query may be input initially by the user in the form of a text string, such as the one above, and the system translates the query text string into a sequence of operations involving searches over multiple modalities, for example, content, models, and text, and fusion of the results as follows:

Search for images with color similar to example query images of beach scenes,

Combine results with model="sky" using "average" aggregation function,

Combine with model="water" using "product" aggregation function,

Combine with text="beach" using "minimum" aggregation function.

Alternatively, the search fusion can be applied interactively, in which the user can alter the searches, normalization or fusion operations depending on the interim results. For example, the user can issue the following sequence of searches in which the user views the results at each stage, which corresponds to the following query statement: ((beach text) AND (beach color) AND (sky model) AND (water model)):

Search for text="beach",

Select results that best depict beach scenes. Search based similar color. Combine with previous results using "product" aggregation function, Combine with model="sky" using "average" aggregation function, Combine with model="water" using "product" aggregation function.

Figure 4:
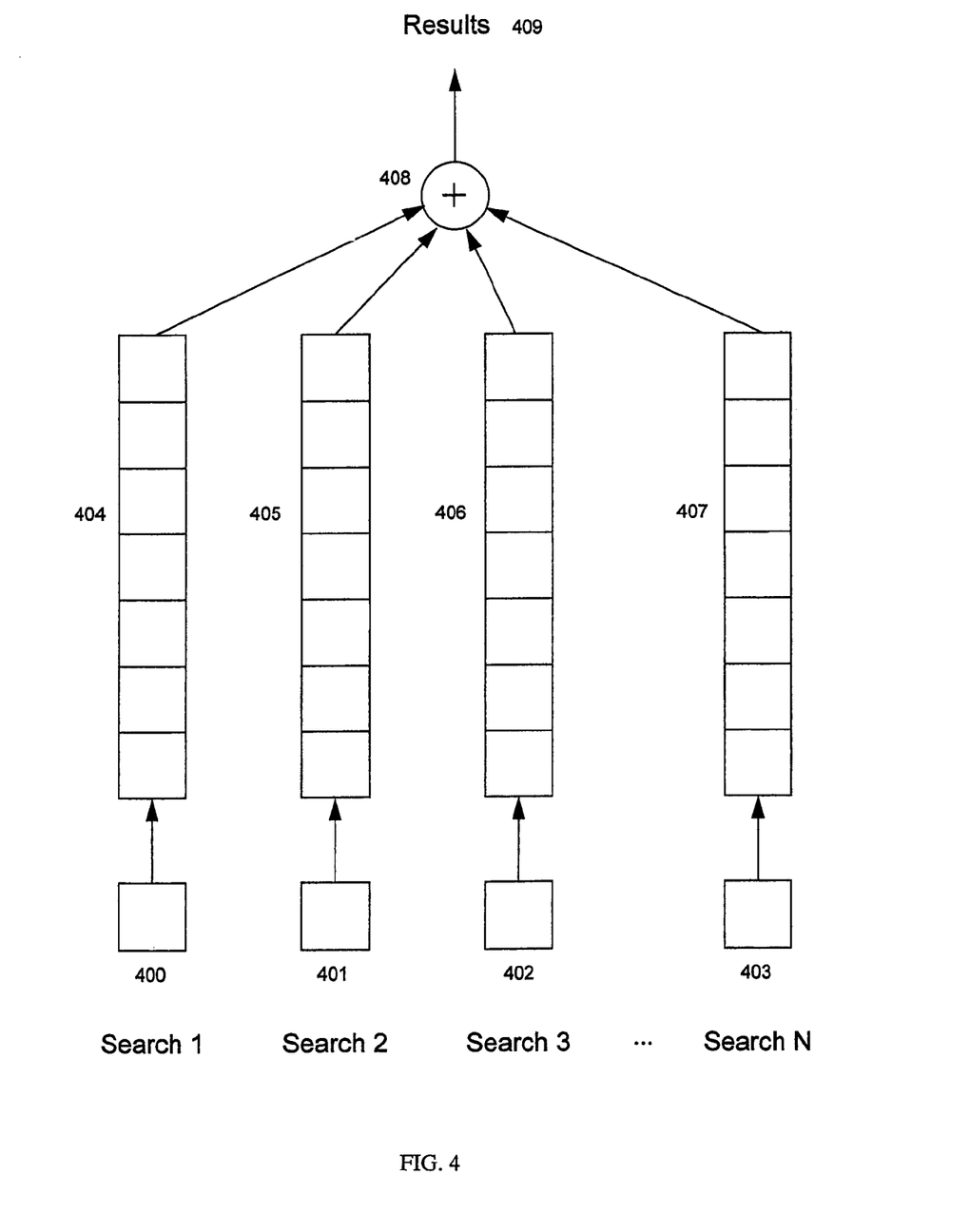
FIG. 4 shows the fusion of multiple search results.

FIG. 4 shows an example of fusion of multiple search results. In this example a query is input which produces searches 1-4 (steps 400-403). Each of these produces a results list (404-407). These results lists are then optionally normalized and then fused in step (406) to produce a single results list output (step 409).

Figure 5:
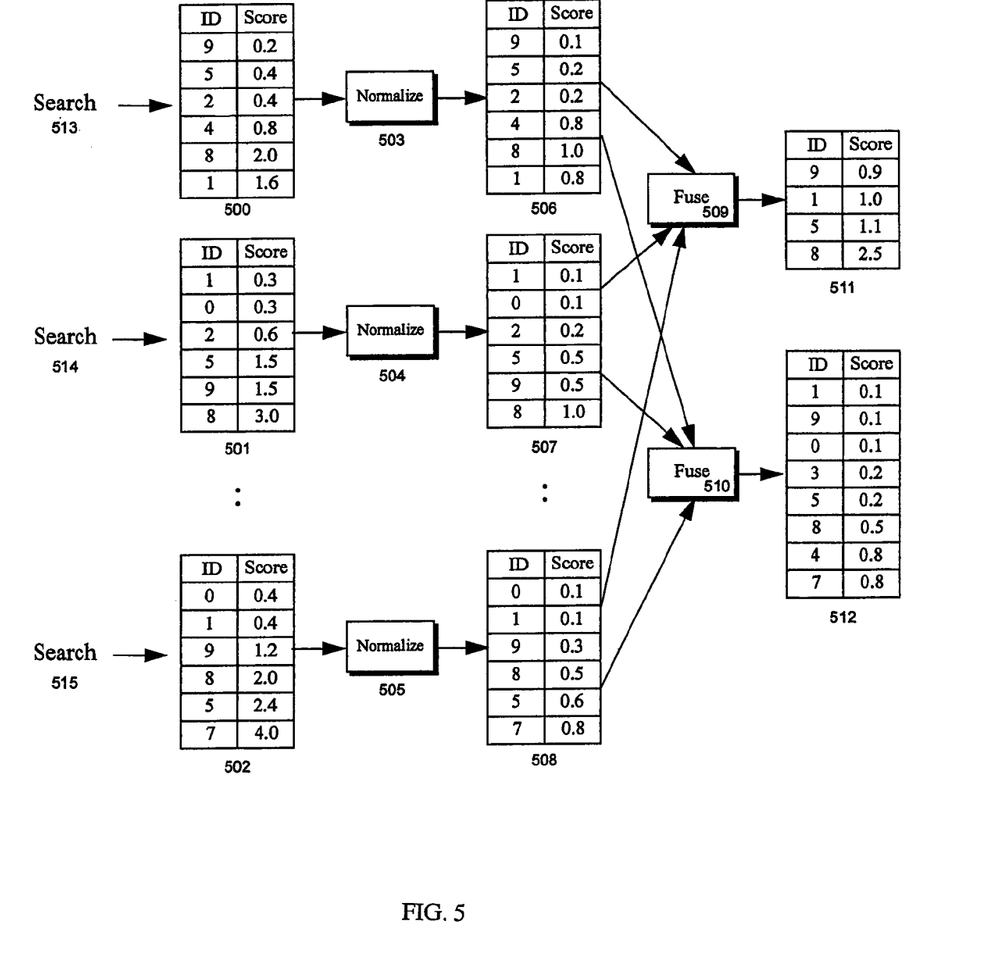
FIG. 5 shows two examples of fusing three sets of search results, which includes normalization. One example shows intersection as combination method with sum as the aggregation function. The other example shows union as the combination method with min as the aggregation function.

FIG. 5 shows two examples of fusing three sets of search results (500-502). This includes a normalization step (503-505) for each results list (500-502) in which the scores are normalized to be within the range of 0 to 1 to produce normalized results lists (506-508). The results are then fused using two different methods. The first example shows fusion in step (509) using intersection as combination method with sum as the aggregation function to produce results list (511). The second example shows fusion in step (510) using union as the combination method with min as the aggregation function to produce results list (512).

Figure 6:
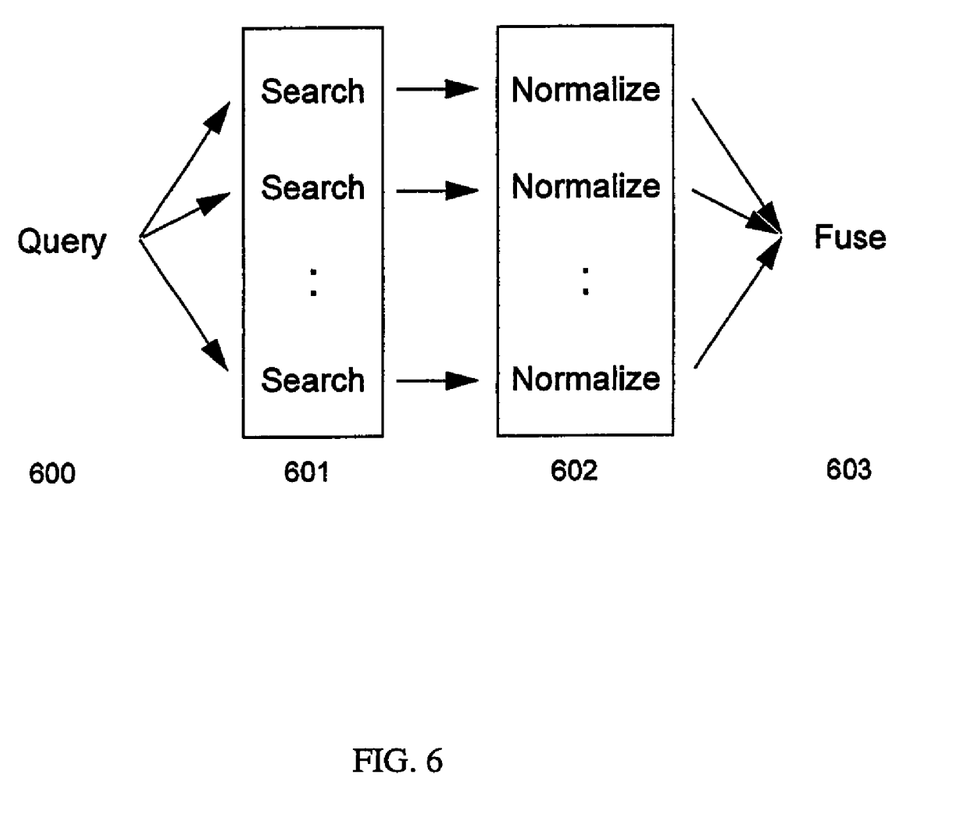
FIG. 6 shows the execution of search fusion query by parallel search and normalization operations.

FIG. 6 shows the execution of search fusion query by parallel search and normalization operations. In the case of manual operation, the query (600) can be executed through parallel operations, in which a plurality of searches (step 601) are conducted, the results are optionally normalized (step 602) and then fused (step 603).

Figure 7:
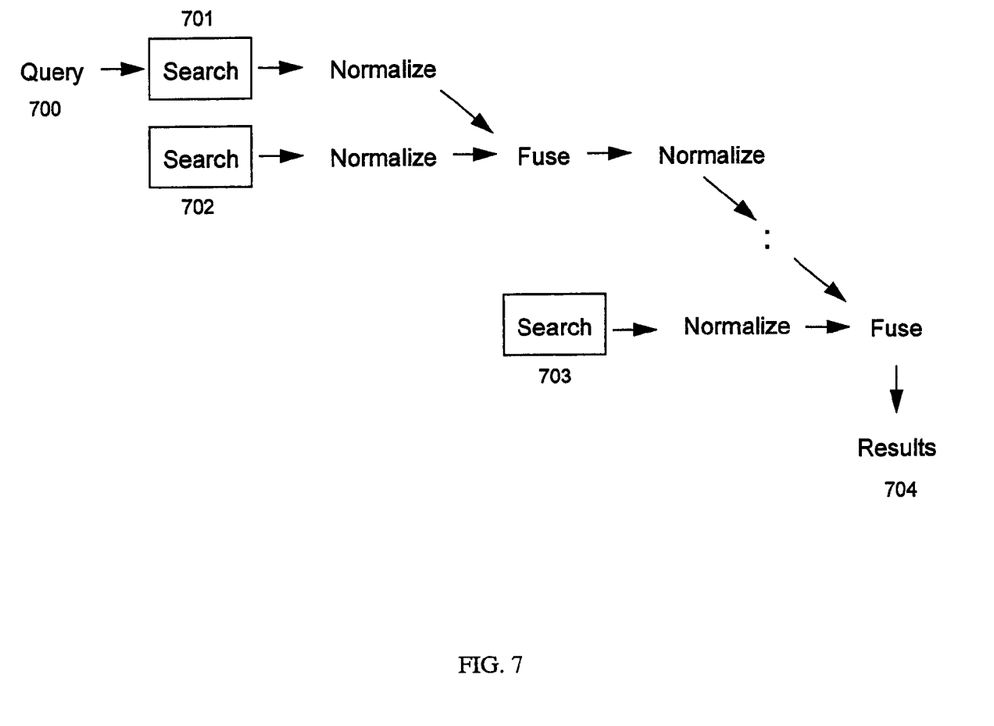
FIG. 7 shows the execution of search fusion query by serial operations of searching, normalizing, and fusing.

FIG. 7 shows the execution of search fusion query by serial operations of searching, normalizing, and fusing. In the case of interactive operation, the query (700) can be executed through a cascade of sequential operations in which searches are conducted (steps 701, 702), the outputs are normalized and fused and then used again as input for further normalization and fusion with the results of a subsequent search (step 703). This cascade operation can continue by fusing prior results with new search results until final results list is achieved (step 704).

Figure 8:
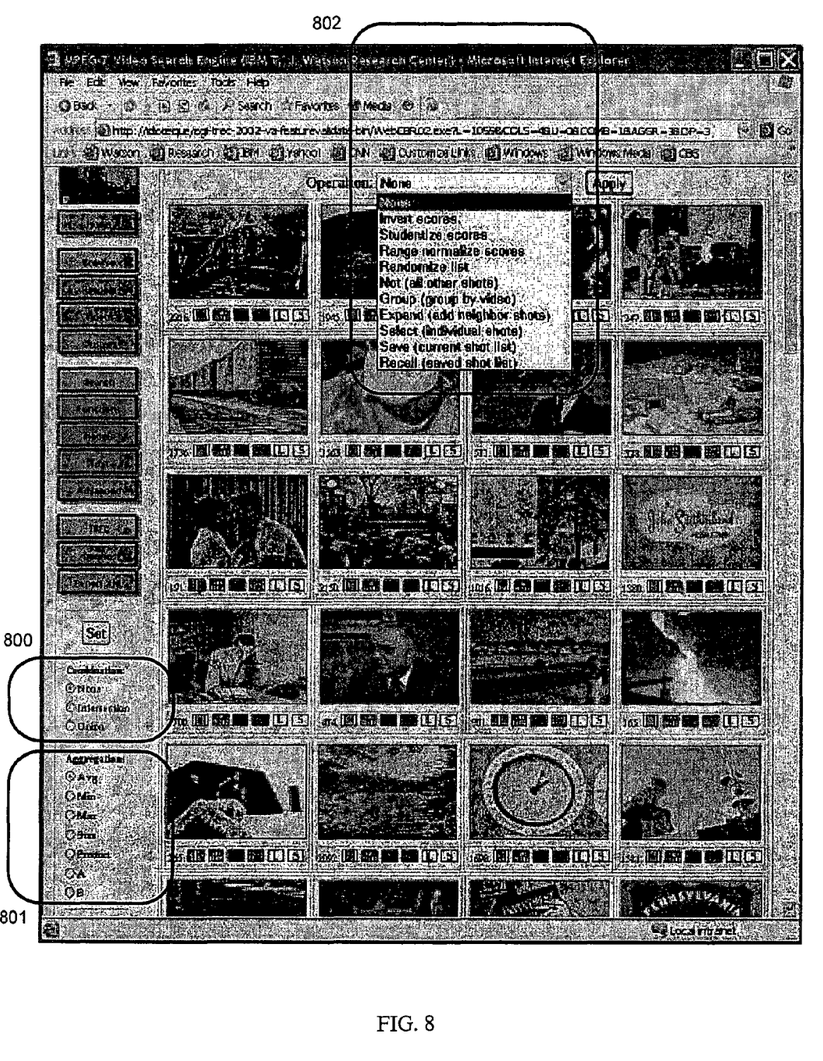
FIG. 8 shows an example video search engine that provides user interface for constructing a search fusion query involving a selection of normalization functions, combination methods, and aggregation functions.

FIG. 8 shows an example video search engine apparatus that provides a graphical user interface for constructing a search fusion query over multiple modalities (content, models, text, etc.) by forming multiple uni-modal search and selecting fusion methods, for example, normalization functions (802), combination methods (800), and aggregation functions (801), for fusing search results. The user operates this system in interactive fashion to conduct search fusion queries by issuing an initial search, for example, content-based retrieval, model-based retrieval, text-based retrieval, etc. The results are then display to the user in the form of thumbnail images, which are scored and ranked. The user can then optionally apply a normalization function (802), for example, to range normalize scores, invert scores, studentize scores, etc. The user can then set a combination method (800), for example, union or intersection, and an aggregation function (801), for example, average, minimum, maximum, sum, product, etc. Once the fusion is set, then the user conducts a subsequent search, again using content-based retrieval, model-based retrieval, text-based retrieval, etc. The results of the search are then fused with the results of the prior search using the selected combination method (800) and aggregation function (801).

Each of the content-based searches may also involve a multi-example search allows the user to provide or select multiple examples from a results list and issue a query that is executed as a sequence of independent searches using each of the selected items. The user can also select a descriptor for matching and an aggregation function for combining and re-scoring the results from the multiple searches. Consider for each search k of K independent searches the scored result $S_k(n)$ for each item n, then the final scored result $Q_d(n)$ for each item with id=n is obtained using a choice of the following fusion functions:

Average: Provides "and" semantics. This can be useful in searches such as "retrieve matches similar to item "A" and "B".

$$Q_d(n) = \frac{1}{K}\sum_k (S_k(n)).$$

Minimum: Provides "or" semantics. This can be useful in searches such as "retrieve items that are similar to item "A" or item "B". $Q_d(n)=\min_k(S_k(n))$.

Maximum: $Q_d(n)=\max_k(S_k(n))$.

Sum: Provides "and" semantics. $Q_d(n)=\Sigma_k(S_k(n))$.

Product: Provides "and" semantics and better favors those items that have low scoring matches compared to "average". $Q_d(n)=\Pi_k(S_k(n))$.

The search engine can be used, for example, for forming search fusion queries that fuse search results for content-based retrieval (CBR) and model-based retrieval (MBR) as follows:

Select example images or content and issue an initial CBR search;

Select a model and issue MBR search;

Select fusion methods and fuse CBR and MBR results lists.

For example, the following sequence of operations was executed for query of video clips of "Garden scenes":

Select example image of "garden scene" and perform CBR search using color correlograms;

Issue MBR using "Landscape" model and fuse with CBR result using "intersection" combining method and "product" aggregation function.

The query can be enhanced by considering interactive querying using CBR and MBR to examine whether search performance increases with interactivity. Consider the expanded search for gardens, which uses the initial search steps above, then an additional interactive step is applied as follows:

Select top 10 example results from manual search;

Perform multi-example CBR using color correlograms and combine with manual search results using "intersection" combining method and "average" aggregation function.

As shown in this video search engine example, the search fusion method and apparatus can be used to query video or multimedia repository. Furthermore, the search query can be used to find and retrieve particular video clips or multimedia objects based on the query. Furthermore, the results can be classified or clustered based on the degree of match to the query or rank in the results list. The search fusion method can also be used to personalize or summarize multimedia content, for example, by finding the particular video segments that match a query and weighting the segments according to degree of match. This weighting can then be used to adaptively rescale, truncate, or sample the video clips to produce a summary. The search fusion query can also be used for purposes of information mining and knowledge discovery given the association and ranking of objects in response to search fusion queries, which can aid in discovering correlations and other relationships among those objects.

The multi-modal search fusion method addresses the problem in which a user with an information need is faced with the task of trying to formulate queries over multiple disparate data sources in order to retrieve the desired matches. The multi-modal search fusion approach allows the user to manually or interactively build a query by sequentially choosing among the descriptors and data sources and by selecting from various combining and score aggregation functions to fuse results of individual searches. For example, this allows building of queries such as "retrieve video clips that have color of beach scenes, the detection of sky, and detection of water." The interactive search fusion method allows users to build queries of multimedia databases using multiple individual search tools. For example, consider a simple case in which the user wants video clips of 'Thomas Jefferson' and issues the query "retrieve video clips that look like given example clip of 'Thomas Jefferson' and have detection of 'face'" This query involves both CBR ("looks like") and MBR ("face detection"). In practice CBR is not sufficient for retrieving matches based on semantics. However, the addition of the MBR search when combined with the CBR can improve retrieval effectiveness. In other cases, the user can build the query interactively based on the intermediate results of the searches. For example, consider user wanting to retrieve "scenes showing gardens". The user can issue a MBR search for "scenes classified as landscape." Then, the user can select some of the best examples of scenes of "gardens" issue a second CBR search for similar scenes and fuse with the result of the "landscape" model. The search fusion method supports this type of query problem by providing controls for fusing multiple searches, which involves selecting from normalization and combination methods and aggregation functions. This allows the user the greatest flexibility and power for composing and expressing complex queries of video databases.

It is to be understood that the present invention, in accordance with at least one presently preferred embodiment, includes an arrangement for an arrangement for forming a plurality of uni-modal searches and an arrangement for combining results of uni-modal searches. Together, these elements may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus for constructing and executing a fusion search for searching a multimedia database, said apparatus comprising:

a graphical user interface for forming a plurality of searches that produce intermediate search results, wherein a user builds a fusion search constructed as a text string interactively by sequentially choosing among descriptors and data sources and by selecting from various combining and score aggregation functions to fuse results of each individual search technique, and wherein each of the plurality of searches utilizes a different search technique, and wherein said search techniques consist of:

content-based retrieval which allows searching and matching based on perceptual similarity of multimedia content, wherein a user provides at least one example of multimedia content and result similarity is based on distance in feature space; and model-based retrieval which allows searching based on automatically extracted concept labels produced by statistical models, wherein a user provides desired label text and matches are ranked using $D=1-C$, with distance D derived from a confidence score C associated with each automatically assigned label;

an arrangement for a graphical user interface interactively integrating the plurality of searches to selectively direct each search to multiple individual search tools and provide desired matches from multiple disparate data sources based on the search technique and content type;

an input interface for permitting the selection of at least one fusion method to be used in combining a plurality of results of said searches the intermediate search results;

an arrangement for combining the intermediate search results of said searches interactively based on the intermediate search results of the searches until a final results list is achieved;

an arrangement for returning the plurality of results intermediate search results to a user; and an arrangement for returning a fused result the final results list to a user;

wherein the plurality of intermediate search results of said searches include multimedia; and wherein the apparatus is configured to execute a cascade of sequential operations, the cascade of sequential operations comprising conducting the plurality of searches that produce the intermediate search results, normalizing the intermediate search results, fusing the intermediate search results to produce fused results, and using the fused results as input for further normalization and fusion with subsequent intermediate results of a subsequent search until the final results list is achieved.

2. The apparatus according to claim 1, wherein said fusion method involves normalization of at least one of said plurality of intermediate search results, the normalization comprising one or more of invert, studentize, and range normalize operations.

3. The apparatus according to claim 1, wherein said fusion method involves aggregation of at least one of said plurality of intermediate search results, said aggregation comprising one or more of average, minimum, maximum, sum, and product operations.

4. A method for constructing and executing a fusion search for searching a multimedia database, said method comprising the steps of:

forming a plurality of searches that produce intermediate search results, wherein a user builds a fusion search constructed as a text string interactively by sequentially choosing among descriptors and data sources and by selecting from various combining and score aggregation functions to fuse results of each individual search technique, and wherein each of the plurality of searches utilizes a different search technique, and wherein said search techniques consist of:

content-based retrieval which allows searching and matching based on perceptual similarity of multimedia content, wherein a user provides at least one example of multimedia content and result similarity is based on distance in feature space; and model-based retrieval which allows searching based on automatically extracted concept labels produced by statistical models, wherein a user provides desired label text and matches are ranked using $D=1-C$, with distance D derived from a confidence score C associated with each automatically assigned label;

interactively integrating the plurality of searches to selectively direct each search to multiple individual search tools and provide desired matches from multiple disparate data sources based on the search technique and content type;

selecting at least one fusion method to be used in combining a plurality of the intermediate search results of said searches;

combining the plurality of intermediate search results of said searches interactively based on the intermediate results of the searches until a final results list is achieved;

returning the plurality of intermediate search results to a user; and returning a fused result the final results list to a user;

wherein the plurality of intermediate search results of said searches include multimedia data; and wherein combining the intermediate search results interactively further comprises executing a cascade of sequential operations, the cascade of sequential operations comprising conducting the plurality of searches that produce the intermediate search results, normalizing the intermediate search results, fusing the intermediate search results to produce fused results, and using the fused results as input for further normalization and fusion with subsequent intermediate results of a subsequent search until the final results list is achieved.

5. The method according to claim 4, wherein said fusion method involves normalization of at least one of said plurality of intermediate search results, the normalization comprising one or more of invert, studentize, and range normalize operations.

6. A program storage device readable by machine, tangibly embodying a program of instructions executable by the machine to perform method steps for constructing and executing a fusion search for searching a multimedia database, said method comprising the steps of:

forming a plurality of searches that produce intermediate search results, wherein a user builds a fusion search constructed as a text string interactively by sequentially choosing among descriptors and data sources and by selecting from various combining and score aggregation functions to fuse results of each individual search technique, and wherein each of the plurality of searches utilizes a different search technique, and wherein said search techniques consist of:

content-based retrieval which allows searching and matching based on perceptual similarity of multimedia content, wherein a user provides at least one example of multimedia content and result similarity is based on distance in feature space; and model-based retrieval which allows searching based on automatically extracted concept labels produced by statistical models, wherein a user provides desired label text and matches are ranked using $D=1-C$, with distance $D$ derived from a confidence score $C$ associated with each automatically assigned label;

interactively integrating the plurality of searches to selectively direct each search to multiple individual search tools and provide desired matches from multiple disparate data sources based on the search technique and content type;

selecting at least one fusion method to be used in combining a plurality of the intermediate search results of said searches;

combining the plurality of intermediate search results of said searches interactively based on the intermediate results of the searches until the final results list is achieved;

returning the plurality of intermediate search results to a user; and returning a fused result the final results list to a user;

wherein the plurality of intermediate search results of said searches includes include multimedia data; and wherein combining the intermediate search results interactively further comprises executing a cascade of sequential operations, the cascade of sequential operations comprising conducting the plurality of searches that produce the intermediate search results, normalizing the intermediate search results, fusing the intermediate search results to produce fused results, and using the fused results as input for further normalization and fusion with subsequent intermediate results of a subsequent search until the final results list is achieved.

* * * * *

UNITED STATES PATENT AND TRADEMARK OFFICE
CERTIFICATE OF CORRECTION

PATENT NO. : 7,610,306 B2  Page 1 of 1
APPLICATION NO. : 10/611235
DATED : October 27, 2009
INVENTOR(S) : Lin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 522 days.

Signed and Sealed this

Twelfth Day of October, 2010

David J. Kappos
*Director of the United States Patent and Trademark Office*